(12) United States Patent
Oka

(10) Patent No.: US 8,745,609 B2
(45) Date of Patent: Jun. 3, 2014

(54) IMAGING SYSTEM

(75) Inventor: Koji Oka, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 267 days.

(21) Appl. No.: 12/960,869

(22) Filed: Dec. 6, 2010

(65) Prior Publication Data

US 2011/0145804 A1 Jun. 16, 2011

(30) Foreign Application Priority Data

Dec. 15, 2009 (JP) ................................ 2009-283851

(51) Int. Cl.
*G06F 9/45* (2006.01)

(52) U.S. Cl.
USPC ......................................................... 717/168

(58) Field of Classification Search
USPC ......................................................... 717/168
See application file for complete search history.

(56) References Cited

U.S. PATENT DOCUMENTS

| 7,506,336 B1 * | 3/2009 | Ninan ............................ 717/175 |
| 7,750,940 B2 | 7/2010 | Tanaka |
| 2005/0057991 A1 * | 3/2005 | Kosugiyama et al. ......... 365/222 |
| 2009/0037904 A1 * | 2/2009 | Cohen et al. ................... 717/175 |

FOREIGN PATENT DOCUMENTS

| JP | 10-239727 A | 9/1998 |
| JP | 2003-107315 A | 4/2003 |
| JP | 2005-78343 A | 3/2005 |
| JP | 2006-121418 | 5/2006 |
| JP | 2007-110314 | 4/2007 |
| JP | 2007-266780 | 10/2007 |
| JP | 2008-116660 | 5/2008 |
| JP | 2009-93251 A | 4/2009 |
| JP | 2010-204430 | 9/2010 |

OTHER PUBLICATIONS

Office Action issued Aug. 6, 2013, in Japanese Patent Application No. 2009-283851.

* cited by examiner

*Primary Examiner* — John Chavis
(74) *Attorney, Agent, or Firm* — Oblon, Spivak, McClelland, Maier & Neustadt, L.L.P.

(57) ABSTRACT

An imaging system has a lens unit including an imaging device which converts an optical image representing an object into image data by an imaging unit, a main body unit which holds the lens unit in such a manner that the lens unit is attachable to and detachable from the main body unit and a controller configured, by use of an integrated firmware in which one or a plurality of firmwares of the lens unit and one or a plurality of firmwares of the main body unit are integrated, to exchange the integrated firmware between the lens unit and the main body unit via a communication device, and to upgrade one of the firmwares with a corresponding firmware in the integrated firmware.

12 Claims, 22 Drawing Sheets

FIG. 5

| | |
|---|---|
| MODEL NUMBER | (MODEL : 0001) |
| UNIT TYPE [LENS/MAIN] | (UNIT : LENS) |
| TYPE OF MAKER | (MAKER : XXXX) |
| FILE NAME OF LENS-UNIT FIRMWARE | (alunch1) |
| FILE NAME OF LENS-UNIT FIRMWARE | (alunch2) |
| . . . . . . . . . . . | (alunchN) |
| OTHER VARIOUS INFORMATION | |
| MAIN-CPU FIRMWARE VERSION NUMBER | (MAIN : V1.12) |
| VERSION NUMBER OF MONITOR PROGRAM | (MONI : V1.00) |
| VERSION NUMBER OF ADJUSTMENT VALUE DATA | (ADJD : V1.12) |
| SUB-CPU FIRMWARE VERSION NUMBER | (CPU1 : V1.00) |
| FIRMWARE-UPGRADE POSSIBILITY INFORMATION<br>　　(0: POSSIBLE<br>　　　1: IMPOSSIBLE BECAUSE OF BATTERY SHORTAGE<br>　　　2: IMPOSSIBLE BECAUSE OF INSUFFICIENT MEMORY<br>　　　3: IMPOSSIBLE BECAUSE OF OTHER REASONS) | |

FIG. 6

UPGRADE FIRMWARE

1. SET MODE DIAL TO SCENE WHILE CAMERA IS TURNED OFF, AND TURN ON CAMERA.

2. PRESS DOWN "PLAY" BUTTON FOR TWO OR THREE SECONDS WHILE PRESSING ADJ./OK BUTTON IN UPPER DIRECTION.
   - FIRMWARE UPGRADE CONFIRMATION MESSAGE IS DISPLAYED ON IMAGE MONITOR.

3. PRESS ADJ./OK BUTTON IN LOWER DIRECTION AND SELECT "YES," AND THEN PRESS ADJ./OK BUTTON.
   - FIRMWARE UPGRADE IS STARTED AND FOLLOWING MESSAGE IS DISPLAYED ON IMAGE MONITOR.
   [CHECKING FIRMWARE.]
   [UPDATING FIRMWARE.]

4. CAMERA IS AUTOMATICALLY TURNED OFF AND IS RESTARTED.
   - IF MESSAGE "INVALID FIRMWARE" IS DISPLAYED ON IMAGE MONITOR AND CAMERA IS AUTOMATICALLY TURNED OFF, CHECK CAMERA MODEL AND UPDATE CAMERA AGAIN BY USE OF VALID FIRMWARE.
   - FIRMWARE FILE COPIED TO SD MEMORY CARD IS DELETED BY INITIALIZING SD MEMORY CARD. DELETE FILE ACCORDING TO NEED.

FIG. 8

| HEADER PART | TOTAL SIZE OF INTEGRATED FIRMWARE |
| --- | --- |
| | INTEGRATED FIRMWARE VERSION (V1.21) |
| | FIRMWARE PATTERN: A |
| | NUMBER OF FIRMWARE MODELS [3] |
| | MODEL A |
| | MODEL B |
| | MODEL C |
| | NUMBER OF FIRMWARES OF MODEL A [5] |
| | Alunch1.frm VERSION (V1.01) |
| | Alunch2.frm VERSION (V1.01) |
| | Alunch3.frm VERSION (V1.21) |
| | Alunch4.frm VERSION (V1.01) |
| | Alunch5.frm VERSION (V1.15) |
| | NUMBER OF FIRMWARES OF MODEL B [3] |
| | Blunch2.frm VERSION (V1.01) |
| | Blunch4.frm VERSION (V1.01) |
| | Blunch5.frm VERSION (V1.21) |
| | NUMBER OF FIRMWARES OF MODEL C [2] |
| | Clunch1.frm VERSION (V1.01) |
| | Clunch2.frm VERSION (V1.15) |
| FIRMWARE PART | SIZE OF Alunch1.frm |
| | CONTENT OF Alunch1.frm |
| FIRMWARE PART | SIZE OF Alunch2.frm |
| | CONTENT OF Alunch2.frm |
| FIRMWARE PART | SIZE OF Alunch3.frm |
| | CONTENT OF Alunch3.frm |
| FIRMWARE PART | SIZE OF Alunch4.frm |
| | CONTENT OF Alunch4.frm |
| FIRMWARE PART | SIZE OF Alunch5.frm |
| | CONTENT OF Alunch5.frm |
| FIRMWARE PART | SIZE OF Blunch2.frm |
| | CONTENT OF Blunch2.frm |
| FIRMWARE PART | SIZE OF Blunch4.frm |
| | CONTENT OF Blunch4.frm |
| ···(OMITTED) | ···(OMITTED) |
| | ···(OMITTED) |
| FIRMWARE PART | SIZE OF Clunch2.frm |
| | CONTENT OF Clunch2.frm |

FIG. 9

| HEADER PART | TOTAL SIZE OF INTEGRATED FIRMWARE |
| --- | --- |
| | INTEGRATED FIRMWARE VERSION (V1.21) |
| | FIRMWARE PATTERN: B |
| | NUMBER OF FIRMWARE MODELS [3] |
| | MODEL A |
| | MODEL B |
| | MODEL C |
| | NUMBER OF FIRMWARES OF MODEL A [5] |
| | Alunch1.frm VERSION (V1.01) |
| | Alunch2.frm VERSION (V1.01) |
| | Alunch3.frm VERSION (V1.21) |
| | Alunch4.frm VERSION (V1.01) |
| | Alunch5.frm VERSION (V1.15) |
| | NUMBER OF FIRMWARES OF MODEL B [3] |
| | Blunch2.frm VERSION (V1.01) |
| | Blunch4.frm VERSION (V1.01) |
| | Blunch5.frm VERSION (V1.21) |
| | NUMBER OF FIRMWARES OF MODEL C [2] |
| | Clunch1.frm VERSION (V1.01) |
| | Clunch2.frm VERSION (V1.15) |
| FIRMWARE PART | SIZE OF ALLlunch.lzh |
| | COMPRESSION FORMAT LZH<br>CONTENT OF ALLlunch.lzh |

FIG. 16

| | |
|---|---|
| HEADER PART | TOTAL SIZE OF INTEGRATED FIRMWARE |
| | INTEGRATED FIRMWARE VERSION (V1.21) |
| | FIRMWARE PATTERN: A |
| | NUMBER OF FIRMWARE MODELS [3] |
| | MODEL A (LENS) |
| | MODEL B (LENS) |
| | MODEL C (MAIN BODY) |
| | NUMBER OF FIRMWARES OF MODEL A [5] |
| | Alunch1.frm VERSION (V1.01) |
| | Alunch2.frm VERSION (V1.01) |
| | Alunch3.frm VERSION (V1.21) |
| | Alunch4.frm VERSION (V1.01) |
| | Alunch5.frm VERSION (V1.15) |
| | NUMBER OF FIRMWARES OF MODEL B [3] |
| | Blunch2.frm VERSION (V1.01) |
| | Blunch4.frm VERSION (V1.01) |
| | Blunch5.frm VERSION (V1.21) |
| | NUMBER OF FIRMWARES OF MODEL C [2] |
| | Clunch1.frm VERSION (V1.01) |
| | Clunch2.frm VERSION (V1.15) |
| COMPATIBILITY TABLE PART | VERSION COMPATIBLE WITH MODEL A: V1.21 |
| | VERSION COMPATIBLE WITH MODEL B: V1.01 |
| | VERSION COMPATIBLE WITH MODEL C: V1.04 |
| FIRMWARE PART | SIZE OF Alunch1.frm |
| | CONTENT OF Alunch1.frm |
| FIRMWARE PART | SIZE OF Alunch2.frm |
| | CONTENT OF Alunch2.frm |
| FIRMWARE PART | SIZE OF Alunch3.frm |
| | CONTENT OF Alunch3.frm |
| FIRMWARE PART | SIZE OF Blunch4.frm |
| | CONTENT OF Blunch4.frm |
| ···(OMITTED) | ···(OMITTED) |
| | ···(OMITTED) |
| FIRMWARE PART | SIZE OF Clunch2.frm |
| | CONTENT OF Clunch2.frm |

FIG. 17

| MODEL NUMBER | (MODEL : 0001) |
|---|---|
| UNIT TYPE [LENS/MAIN] | (UNIT : LENS) |
| TYPE OF MAKER | (MAKER : XXXX) |
| FILE NAME OF LENS-UNIT FIRMWARE | (alunch1) |
| FILE NAME OF LENS-UNIT FIRMWARE | (alunch2) |
| . . . . . . . . . . . | (alunchN) |
| OTHER VARIOUS INFORMATION ||
| Alunch3: MAIN-CPU FIRMWARE VERSION NUMBER | (MAIN : V1.12) |
| Alunch2: VERSION NUMBER OF MONITOR PROGRAM | (MONI : V1.00) |
| Alunch1: VERSION NUMBER OF ADJUSTMENT VALUE DATA | (ADJD : V1.12) |
| Alunch4: SUB-CPU FIRMWARE VERSION NUMBER | (CPU1 : V1.00) |
| USER NAME: XXX ||

FIG. 18

| COMPATIBILITY TABLE PART | MODEL A: COMPARISON CONDITIONS |
|---|---|
| | UPPER LIMIT OF VERSION COMPATIBLE WITH MODEL A: V1.21 |
| | LOWER LIMIT OF VERSION COMPATIBLE WITH MODEL A: V1.09 |
| | MODEL B: COMPARISON CONDITIONS |
| | UPPER LIMIT OF VERSION COMPATIBLE WITH MODEL B: V1.01 |
| | LOWER LIMIT OF VERSION COMPATIBLE WITH MODEL B: V1.00 |
| | MODEL C: COMPARISON CONDITIONS |
| | UPPER LIMIT OF VERSION COMPATIBLE WITH MODEL C: V1.04 |
| | LOWER LIMIT OF VERSION COMPATIBLE WITH MODEL C: V1.01 |

IMAGING SYSTEM

PRIORITY CLAIM

The present application is based on and claims priority from Japanese Patent Application No. 2009-283851, filed on, Dec. 15, 2009, the disclosure of which is hereby incorporated by reference in its entirety.

TECHNICAL FIELD

The present invention relates to an imaging system with interchangeable lenses in which a main body unit and a lens unit are separable, and particularly to an imaging system in which firmware versions of the respective units are managed and controlled.

BACKGROUND OF THE INVENTION

Digital single-lens reflex cameras in which exchangeable imaging lenses can be attached to a main body unit have been marketed as camera systems (imaging systems) in recent years. High-sensitivity imaging with less blurring or noise can be achieved by selecting a desired type from among imaging lenses with various angles of view and brightnesses, and attaching the selected lens to the main body unit.

Generally, available combinations of the main body unit and the imaging lens are often limited for digital single-lens reflex cameras. As a countermeasure, an imaging device, an image processor, and the like are installed in the imaging lens to generate image data on the imaging-lens unit side and transmit the data to the main body unit. This allows a wider variation of imaging lenses to be used in combination with the main body unit.

Further, by generating object image data in an interchangeable lens unit equipped with an imaging device and processing the image data in the main body unit connected to the lens unit, units of the imaging system can be made smaller and image data processing speed can be improved. In addition, by recording image data of a large data amount in a storage of the lens unit and transferring image data downsized through pixel skipping to the main body unit as disclosed in JP2007-110314A, power consumption for data transfer can be suppressed, so that a more energy-efficient device can be achieved.

Such a configuration makes it possible to smoothly attach various replacement lenses to a main body of a camera and utilize a higher performance. In this case, however, each of the units is to install firmware including multiple functions, which causes an important problem of compatibility among the firmwares of the units. Firmware versions may differ among units of the same model, though the difference is difficult to tell from outside. Hence, a lens unit is often attached to a main body unit without checking, and as a result does not operate because of the difference in the firmware version.

For this reason, it is necessary in this type of camera system to make compatible the firmware versions of the image processor on the lens unit side and the image processor on the main body unit side.

JP2006-121418A discloses a technique in which the firmware version of the lens unit is upgraded with firmware transmitted from the main body unit. At the time of upgrading the firmware version of the lens unit, a version number of the firmware is checked so that a warning may be displayed if the firmware version of the lens unit will be downgraded, and version update processing may be performed automatically if the firmware version of the lens unit will be upgraded.

JP2007-266780A discloses a configuration in which information on the firmware version of each component is displayed to the user so that the user can manage them and keep them up to date. The configuration also makes it possible to automatically upgrade the firmware versions of the components if upgrading is necessary.

JP2008-116660A discloses a similar configuration which allows management of version information on each component and automatic upgrading if necessary. Additionally, this configuration makes it possible to update the firmware to the latest version by downloading it from a server.

However, assume a case where the main body unit is of an old version and upgrading only the lens unit will disable normal operation of the system as a whole. With the version update processing configured in the aforementioned manner, the lens unit could be upgraded erroneously, so that in the worst case, it may become impossible to start up the camera system. In addition, there are problems that the lens unit and the main body unit have separate firmwares and that there are constraints such as compatibility among the different versions thereof, so that it is bothersome to manage the versions. Moreover, to adjust the camera to an optimal imaging condition or the like by taking advantage of the interchangeable lenses, a wider variation of lens units needs to be used, which makes the aforementioned problem even larger.

SUMMARY

The present invention has been made to solve the above problems of the conventional techniques, and is aimed to provide an imaging system in which firmwares of multiple units are integrated into a single integrated firmware to be upgraded simultaneously, thereby simplifying management of the versions. Moreover, in the imaging system, the lens unit and the main body unit can be upgraded at the same time so that the upgrading does not result in an unintended combination of versions.

In order to achieve the above object, an imaging system according to an embodiment of the present invention comprises a lens unit including an imaging device which converts an optical image representing an object into image data by an imaging unit, a main body unit which holds the lens unit in such a manner that the lens unit is attachable to and detachable from the main body unit, and a controller configured, by use of an integrated firmware in which one or a plurality of firmwares of the lens unit and one or a plurality of firmwares of the main body unit are integrated, to exchange the integrated firmware between the lens unit and the main body unit via a communication device, and to upgrade one of the firmwares with a corresponding firmware in the integrated firmware.

BRIEF DESCRIPTION OF DRAWINGS

The accompanying drawings are included to provide further understanding of the invention, and are incorporated in and constitute a part of this specification. The drawings illustrate an embodiment of the invention and, together with the specification, serve to explain the principle of the invention.

FIG. 5 is a diagram showing unit information of Example 1.

FIG. 6 is a diagram showing an operation example of updating firmware in Example 1.

FIG. 8 is a diagram showing a configuration example of an integrated firmware of Example 1.

FIG. 9 is a diagram showing another configuration example of the integrated firmware of Example 1.

FIG. 16 is a diagram showing a configuration example of an integrated firmware of Example 2.

FIG. 17 is a diagram showing an example of unit information of Example 2.

FIG. 18 is a diagram showing an extended example of a compatibility table part for comparative determination in Example 2.

DETAILED DESCRIPTION OF THE PREFERRED EMBODIMENT

Hereinbelow, an embodiment of the present invention is described in detail with reference to the drawings.

Figure 1A:
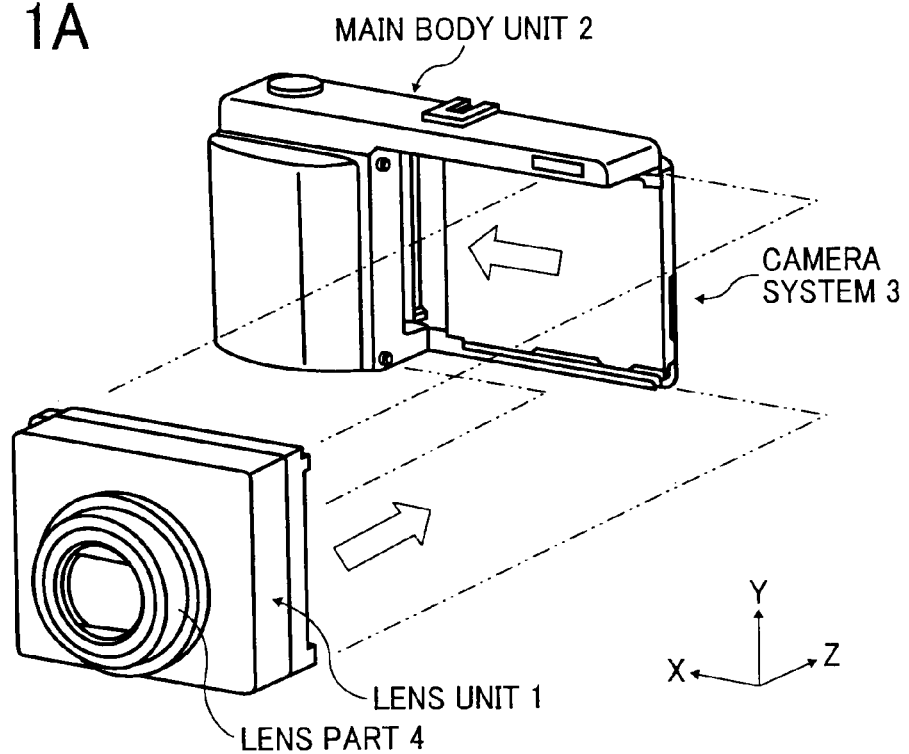
FIGS. 1A and 1B are each a schematic perspective view of a camera system of an embodiment of the present invention.
Figure 1B:
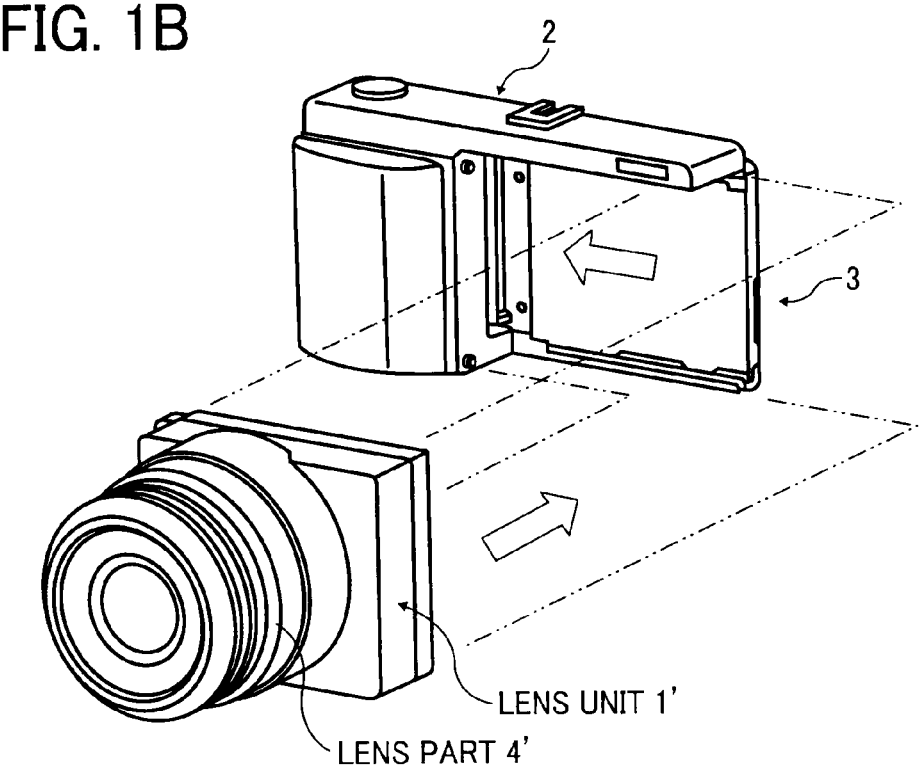

FIGS. 1A and 1B are each a schematic perspective view of a camera system (imaging system) of the embodiment of the present invention. In FIG. 1, a camera system 3 is formed of a main body unit 2 and a lens unit 1 which is attachable to and detachable from the main body unit 2. The lens unit 1 and the main body unit 2 work in unison so that the camera system 3 exerts its function as an imaging apparatus. A user appropriately selects the lens unit 1 from among various types and attaches it to the main body unit 2. For example, the lens unit 1 includes a lens part 4 which is a single-vision lens (FIG. 1A) and a lens part 4' with an optical zoom function (FIG. 1B).

Lens units 1, 1' respectively include the lens parts 4, 4' exposed to the front and CCDs (imaging devices) that perform photoelectric conversion on light from the object which is imaged by the lens parts 4, 4'. The main body unit 2 holds the lens unit 1 so that the lens unit 1 is attachable to and detachable from the main body unit 2. The main body unit 2 drives the CCD and the like by exchanging various control signals with the lens unit 1, to thereby acquire digital image data corresponding to the light from the object.

As the lens units 1, 1', multiple types of the lens parts 4, 4' including those with different focal distances, those with CCDs of different numbers of pixels, one capable of monochrome imaging and one capable of infrared imaging are prepared in advance. By selectively attaching any one of the lens units 1 to the main body unit 2, the camera system 3 is allowed to easily acquire appropriate image data depending on the imaging situation.

Figure 2:
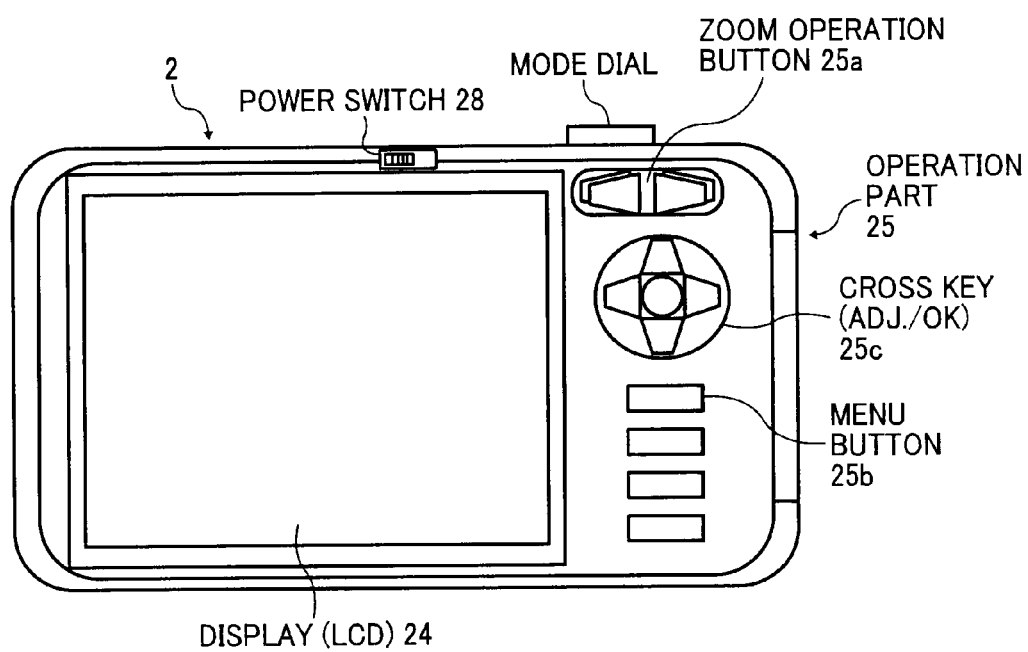
FIG. 2 is a plan view of a main body unit of the embodiment as seen from the back.

FIG. 2 is a plan view of the main body unit as seen from the back. Provided on the back surface of the main body unit 2 are: a power switch 28 for turning on and off the camera system 3; an LCD (display) 24 for displaying a photographed image, live preview, various menu screens, and the like; and an operation part 25 for inputting different instructions to the camera system 3. Arranged in the operation part 25 are: a zoom operation button 25a for changing the zoom magnification of the lens part 4 to the wide side or tele side; a menu button 25b that is operated to display a menu screen on the LCD 24 or to set a selected content; and a cross key (ADJ/OK) 25c for moving a cursor in the menu screen.

Figure 3:
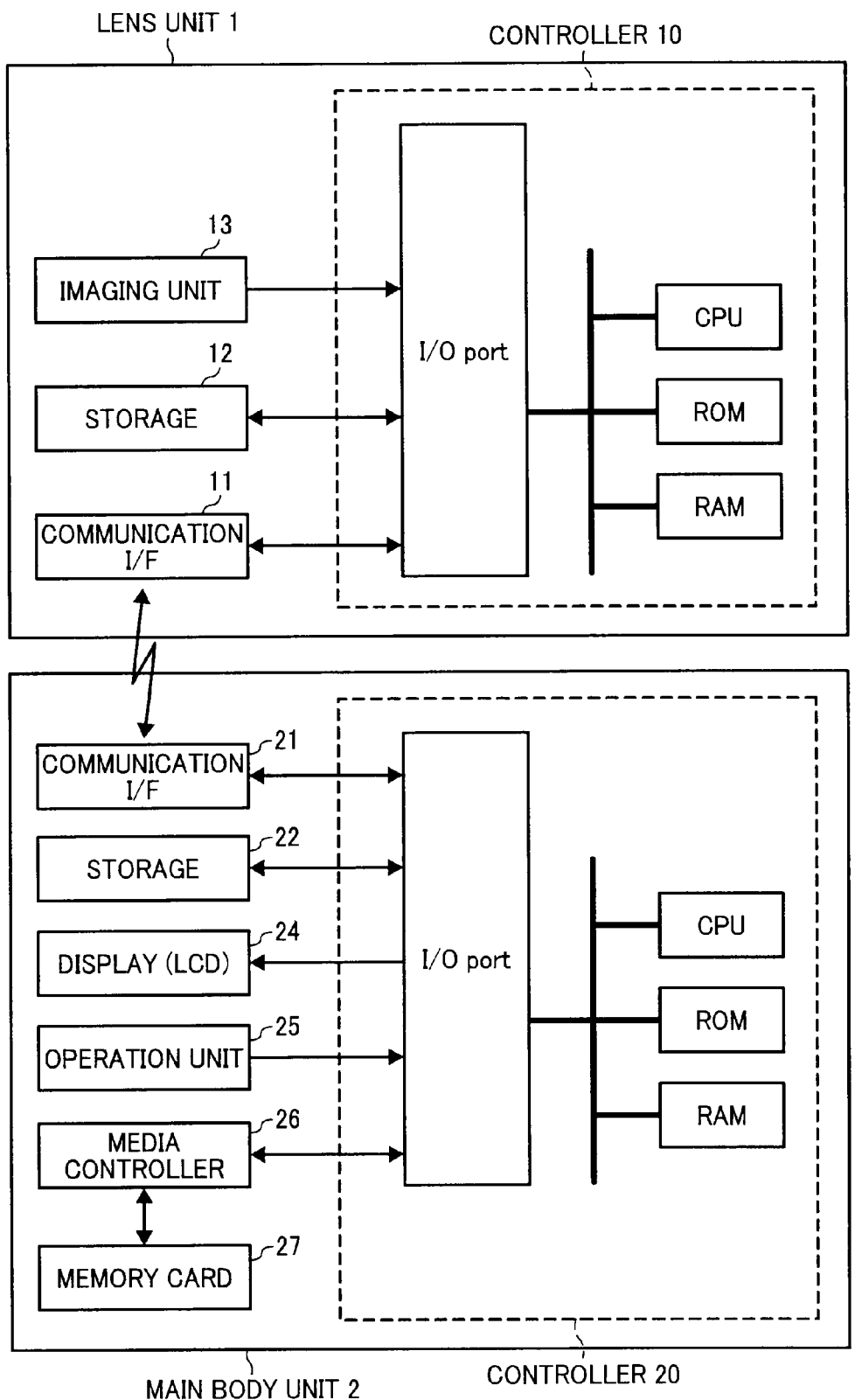
FIG. 3 is a block diagram showing a schematic configuration of the camera system of the embodiment.

FIG. 3 is a block diagram showing a schematic configuration of the camera system of the embodiment. In FIG. 3, the lens unit 1 is capable of communicating with the main body unit 2 by use of a communication I/F 11 such as a serial port or a parallel port.

In addition, the lens unit 1 includes: a storage 12 such as a flash memory for storing firmware and various information; an imaging unit 13 which includes a CCD, AD converter, and the like to which image information is inputted; and a controller 10 for controlling the entire lens unit 1. Note that the controller 10 is configured of a known microcomputer formed of a CPU, a ROM, a RAM, an input/output port (I/O port), a bus line for connecting these components, and the like.

The main body unit 2 includes: a memory card 27 being an external storage device such as an SD card which can be removed; a media controller 26 for controlling the memory card 27; a storage 22 such as a flash memory for storing firmware and various information; the LCD (display) 24 for displaying various information; the operation unit 25 for performing external input; a communication I/F 21 for controlling the interface with the lens unit 1; and a controller 20 for controlling the entire main body unit 2.

The controller 20 is similarly configured of a known micro computer formed of a CPU, a ROM, a RAM, an input/output port (I/O port), a bus line for connecting these components, and the like.

Figure 4:
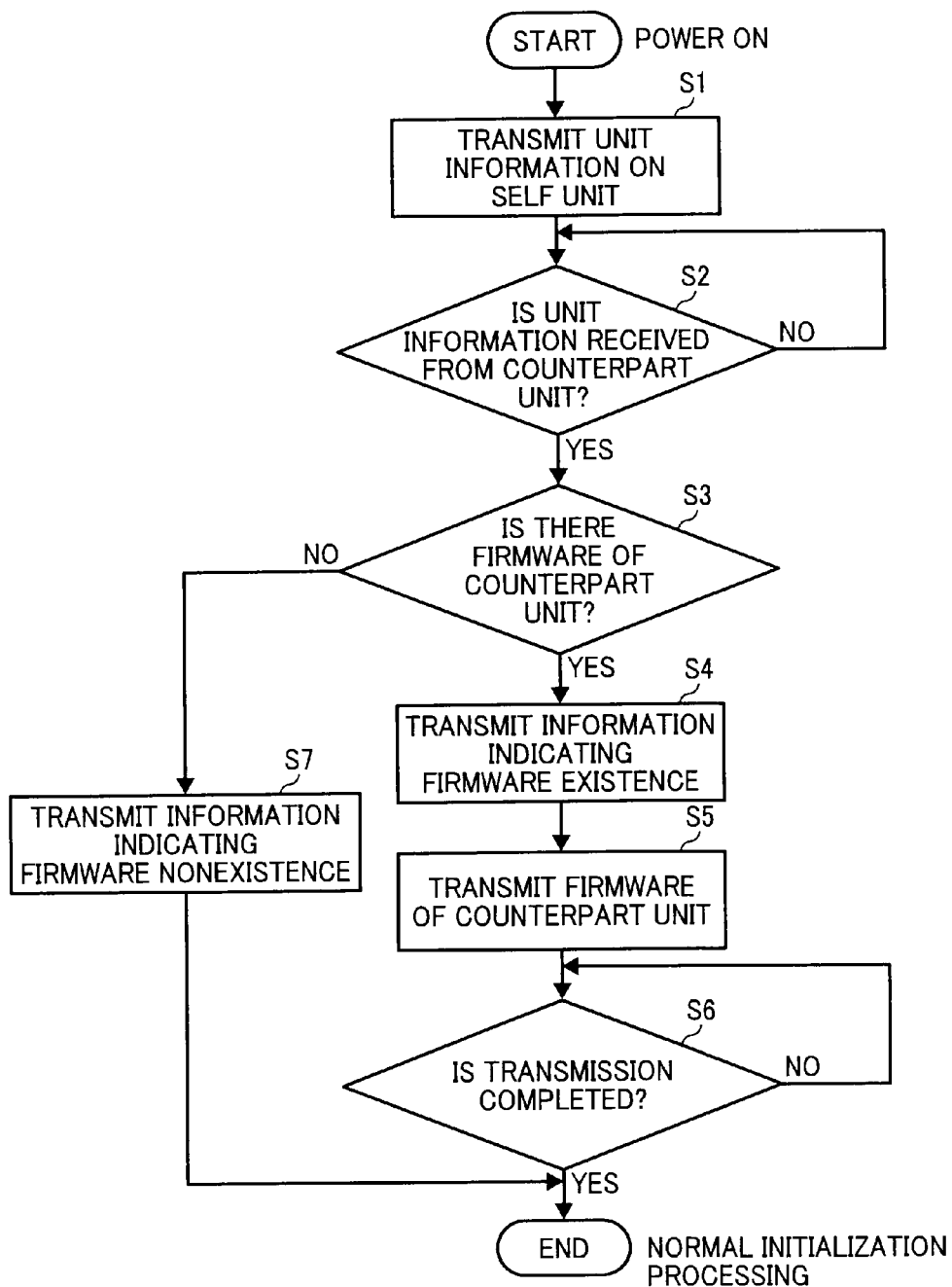
FIG. 4 is a flowchart showing processing on a transmission side performed between units of Example 1 of the embodiment.

Examples of the present invention will be described below. In each of the following examples, a series of upgrading process is performed according to a command of a CPU of the controller 10 or a command of a CPU of the controller 20. FIG. 4 is a flowchart showing processing on a transmission side performed between the lens unit and the main body unit of Example 1 of the embodiment. When the camera system is turned on, unit information as shown in FIG. 5, for example, is transmitted via the communication I/F 21 (see FIG. 3) (S1). The unit information shown in FIG. 5 includes a model number indicating the unit itself, a unit type, and the like. In addition to a version number of main CPU firmware, other version numbers such as those of a monitor program, adjustment value data, sub CPU firmware, and the like are included in the unit information. By thus managing versions of other additional programs, the version numbers can be compared to perform a more severe compatibility check for the camera system with interchangeable lenses.

Thereafter, upon receipt of unit information on its counterpart unit (S2), it is checked from the received unit information whether or not firmware of the counterpart unit exists (S3). The firmware is normally stored in the memory card 27 or the storage 22. For example, if the integrated firmware is in the memory card 27, the controller 20 copies the integrated firmware to the storage 22 and checks whether or not the corresponding firmware exists in the integrated firmware. If the firmware exists (Yes in S3), information indicating that the firmware exists is transmitted to the counterpart unit, so as to prompt the counterpart unit for preparation (S4).

Then, the integrated firmware including the corresponding firmware is transmitted to the counterpart unit (S5). After confirming that the transmission has been completed (S6), the processing is terminated. Meanwhile, if the firmware does not exist in processing S3 (No in S3), information indicating that the firmware does not exist is transmitted (S7).

FIG. 6 describes an operation example of updating corresponding firmware. The processing on the transmission side shown in FIG. 4 may be initiated by an operation as in this operation example, or otherwise may be initiated automatically when the system is normally turned on.

Figure 7:
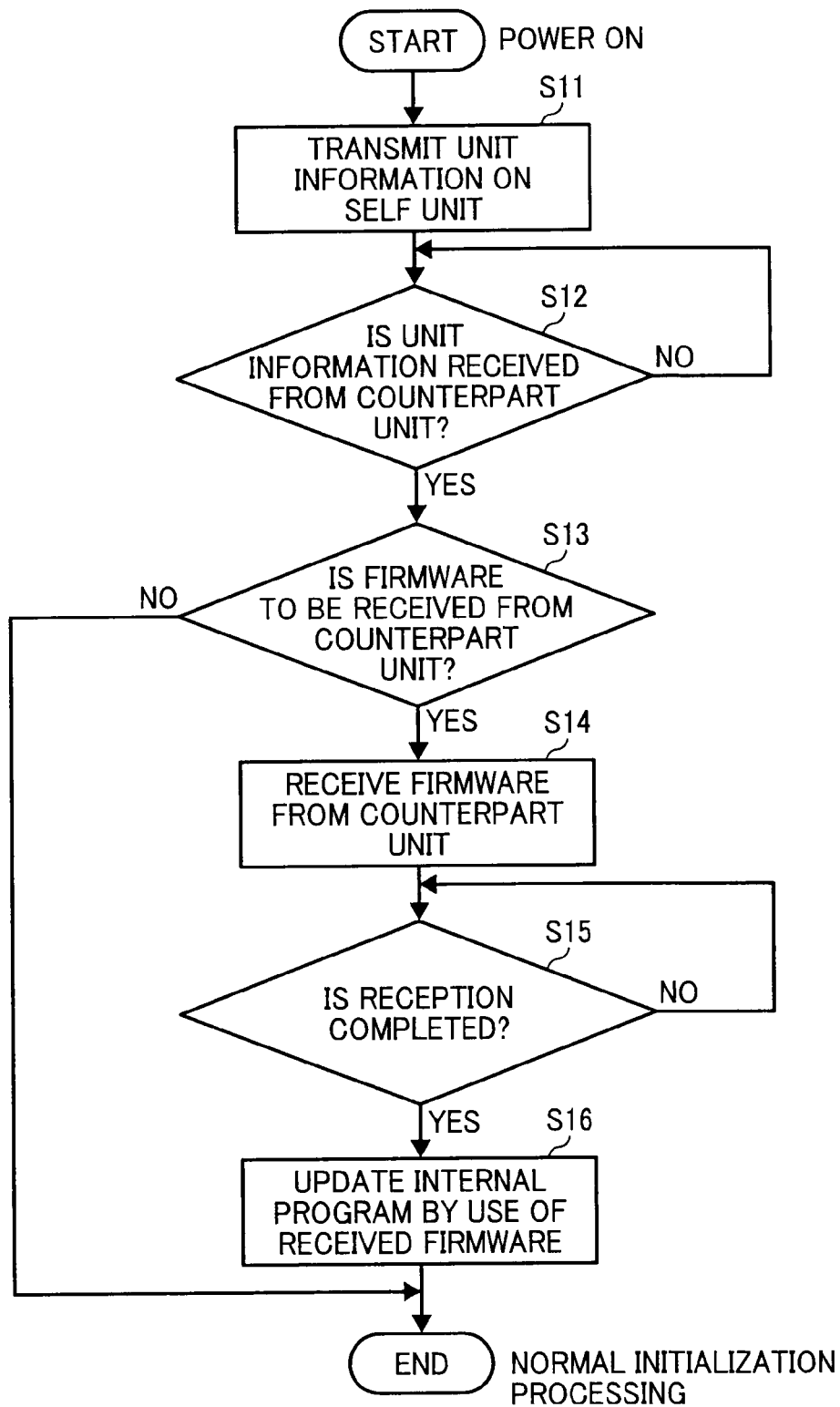
FIG. 7 is a flowchart showing processing on a reception side performed between the units of Example 1.

FIG. 7 is a flowchart showing processing on a reception side in Example 1. When the camera system is turned on, the unit information as shown in FIG. 5 is transmitted via the communication I/F 11 (see FIG. 3) (S11). Upon receipt of the unit information on its counterpart unit (S12), it is checked whether or not firmware will further be transmitted (S13), the check being made on the basis of information received from the counterpart unit on whether the firmware exists or not. If the firmware is not to be received (No in S13), the processing is terminated and control is passed on to normal initialization processing. If the firmware is to be received (Yes in S13), an integrated firmware including the corresponding firmware is received (S14). After confirming that the reception has been completed (S15), an internal program is updated with the corresponding firmware included in the received integrated firmware (S16).

FIG. 8 shows a configuration example of the integrated firmware for integrally managing firmware to be exchanged among units and updated in Example 1. As can be seen in FIG. 8, the integrated firmware manages multiple firmwares (those of the lens unit and the main body unit) in a single file, and can be divided into mainly two parts, a header part and a firmware part.

Registered in the header part are: the number of models, the number of firmwares for each model, file names of the firmwares, and versions of the firmwares. The configuration of the registered firmwares can be determined by analyzing the header part. File sizes of the firmwares and actual firmware files are registered in the firmware part.

Moreover, other conceivable examples include a case of registering multiple files (firmware files themselves) in software for a personal computer by using a general compression/decompression program (such as LZH, TAR, or ZIP). In this case, it suffices that the integrated firmware is configured so that it can be developed to the original firmware on the receiving unit side for processing, and thus various configuration examples other than Example 1 are conceivable.

In addition, by registering an integration form of the firmware part in the header part, expandability thereof can be increased. For example, a firmware pattern A has the configuration shown in FIG. 8, whereas a firmware pattern B has a configuration in which the firmware is compressed by use of the compression program LZH and then registered. FIG. 9 shows a configuration example of the case of using LZH. By compressing the firmware part of the integrated firmware shown in FIG. 8 as in the integrated firmware shown in FIG. 9, the file size of the integrated firmware can be made small, or multiple firmwares can be stored.

Note that transmission of the integrated firmware to the counterpart unit is as shown in the flowchart of the transmission side of FIG. 4, and reception thereof is as shown in the flowchart of the reception side of FIG. 7.

In addition, in the aforementioned processing on the transmission and reception side, firmware-upgrade possibility information is set at the end of the unit information shown in FIG. 5 which is exchanged between the units. With this, it can be determined by referring to the unit information whether or not a firmware upgrading operation can or cannot be performed, and if not, the reason why.

Figure 10:
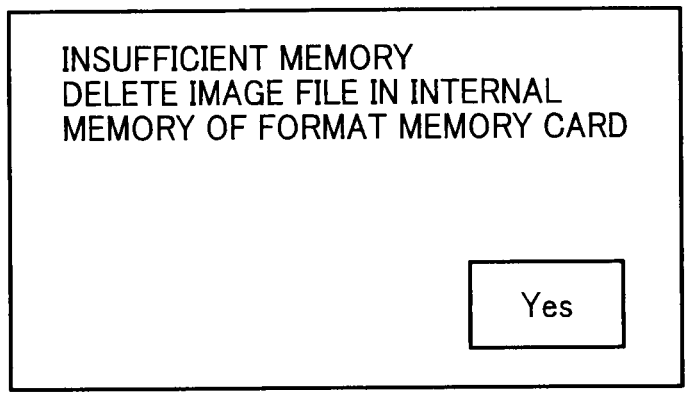
FIG. 10 is a diagram showing an alert display of Example 1.

For example, if the firmware cannot be upgraded and the reason is "2: impossible because of insufficient memory," an alert display as shown in FIG. 10 may be shown to notify the user of the reason why the firmware cannot be upgraded.

This firmware-upgrade possibility information to be set at the end of the unit information may be set by causing the controller to compare a voltage value of a power supply or free space in the storage with a predetermined threshold to make a determination, before performing the aforementioned unit-information transmission processing by the processing S1 in FIG. 4.

Figure 11:
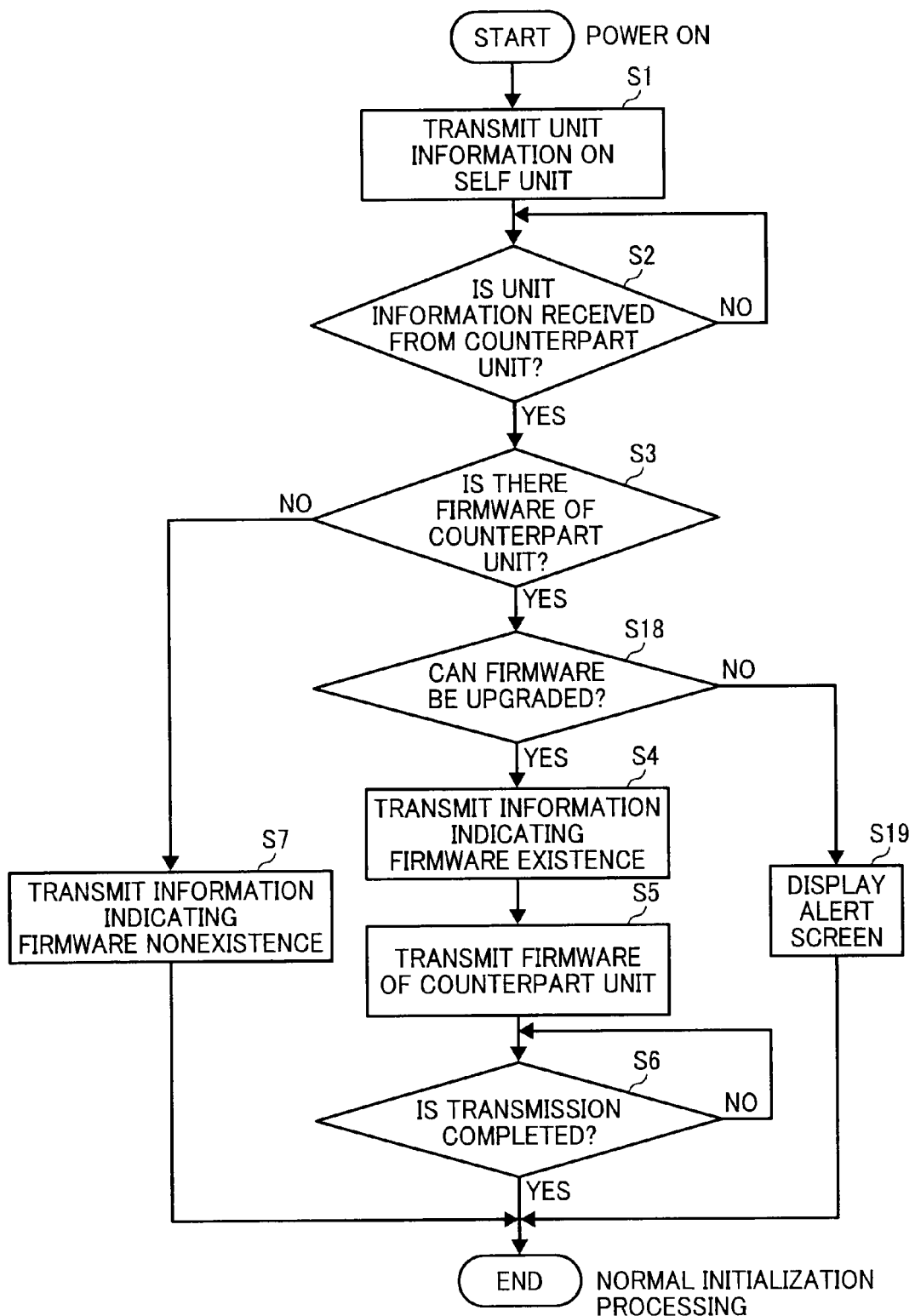
FIG. 11 is a flowchart showing processing on the transmission side performed in a case where the firmware-upgrade possibility information is set in the unit information in Example 1.

FIG. 11 is a flowchart showing processing on the transmission side performed in a case where the firmware-upgrade possibility information is set in the unit information. The flowchart in FIG. 11 is almost the same as the aforementioned flowchart in FIG. 4, except for the following procedure. Between the processing S3 and S4, the possibility or impossibility of the firmware upgrading, which is set in the unit information received from the counterpart unit in the processing S2, is checked (S18). If the firmware cannot be upgraded (No in S18), the alert screen is displayed (S19) and the processing proceeds to normal initialization processing. If the firmware can be upgraded (Yes in S18), the processing S4 of the firmware upgrading operation and steps thereafter are performed.

Figure 12:
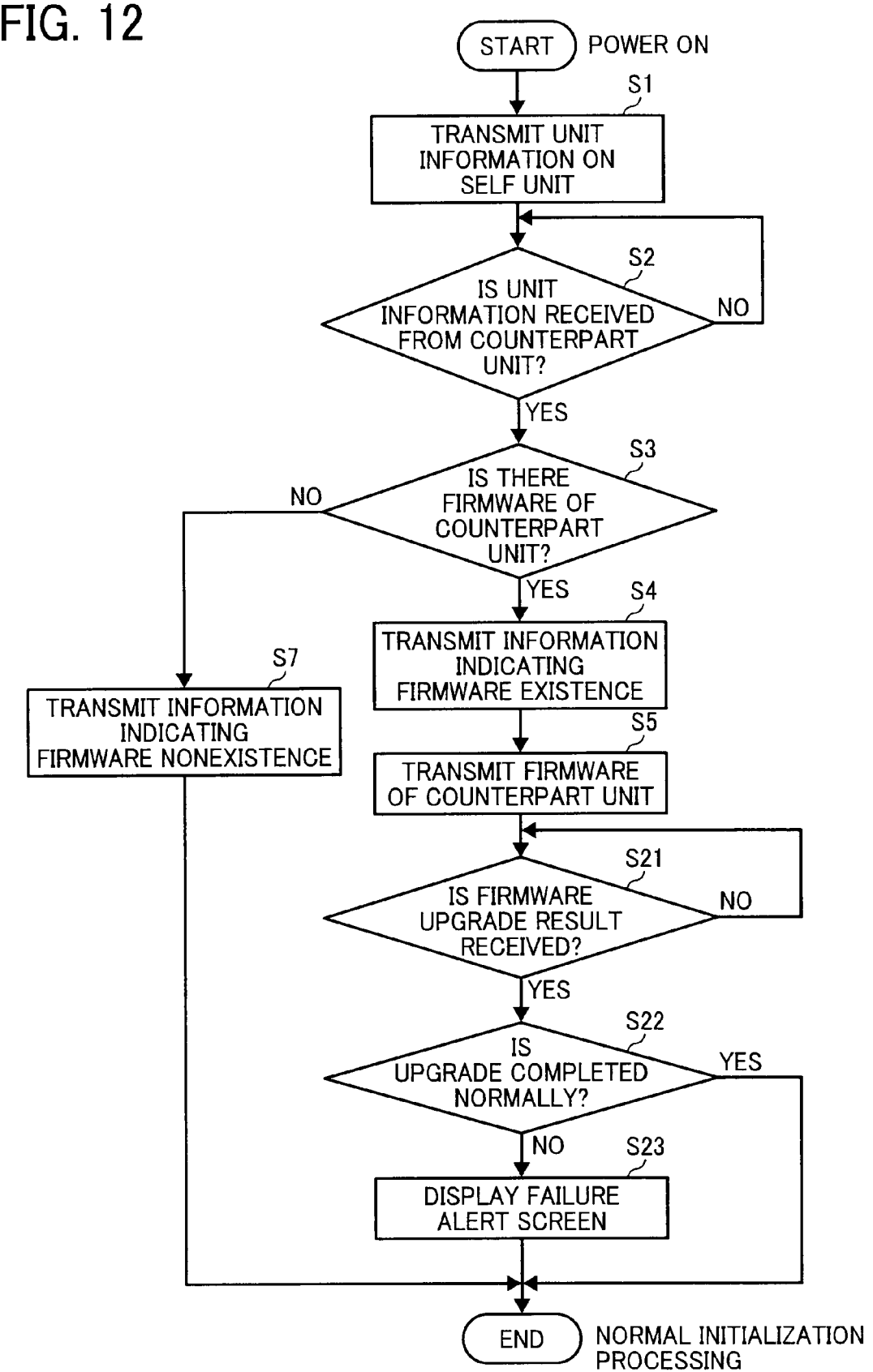
FIG. 12 is a flowchart showing processing on the transmission side in a case of confirming completion of firmware upgrading in Example 1.

FIG. 12 is a flowchart showing processing on the transmission side in a case of confirming completion of firmware upgrading. The flowchart shown in FIG. 12 is almost the same as the aforementioned flowchart in FIG. 4, except that processing after the processing S5 of transmitting the integrated firmware is added.

A result of the firmware upgrade processing is received from the counterpart unit (S21). The received upgrading result is checked (S22) and if the result is abnormal (No in S22), an alert screen indicating that the upgrading has failed is displayed to notify the user (S23). If the result is normal (Yes in S22), normal initialization processing is performed.

Figure 13:
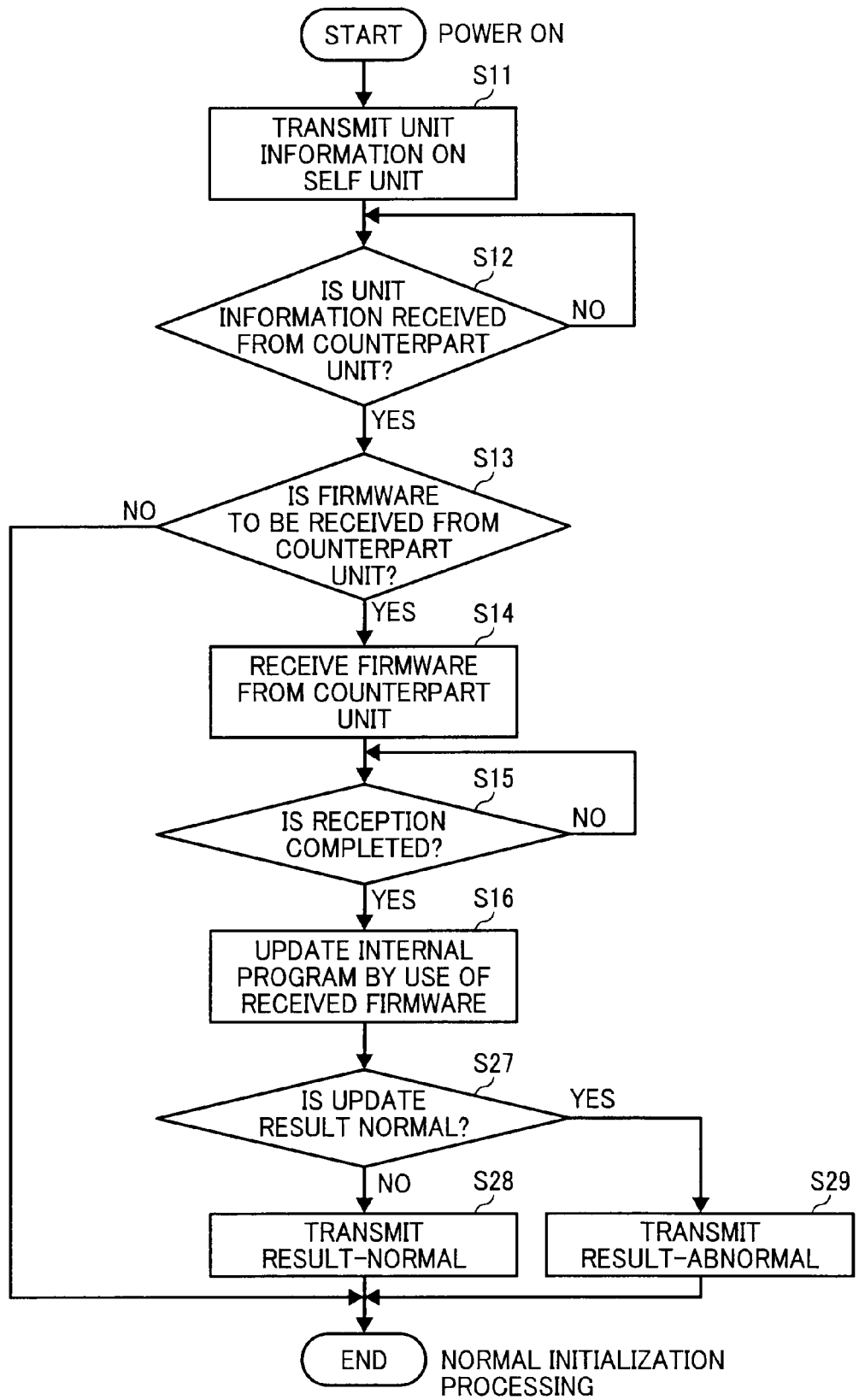
FIG. 13 is a flowchart showing processing on the reception side in the case of confirming completion of firmware upgrading in Example 1.

FIG. 13 is a flowchart showing processing on the reception side in the case of confirming completion of firmware upgrading. The flowchart in FIG. 13 is almost the same as the aforementioned flowchart in FIG. 7, except that completion confirmation processing is added after the processing of updating the internal program with the received firmware (S16).

The result of updating the internal program is checked (S27), and if the result is normal (Yes in S27), a result-normal notification is transmitted to the counterpart unit (S28). If the result is abnormal (No in S27), a result-abnormal notification is transmitted to the counterpart unit (S29). According to the result indicating normal or abnormal, the determination in the processing S22 in FIG. 12 is made and if abnormal, the alert screen is displayed.

Since multiple firmwares are registered in the integrated firmware in Example 1, the integrated firmware may be transmitted to the counterpart unit after upgrading the self unit, to then upgrade the counterpart unit with the integrated firmware.

The operation example of the upgrading is as in the operation example of firmware upgrading in FIG. 6. Through this operation, the self unit is upgraded and then the counterpart unit is upgraded accordingly.

Examples of how the display will be shown include "checking version of main body unit," "upgrading main body unit," "checking version of lens unit," and "upgrading lens unit."

Figure 14:
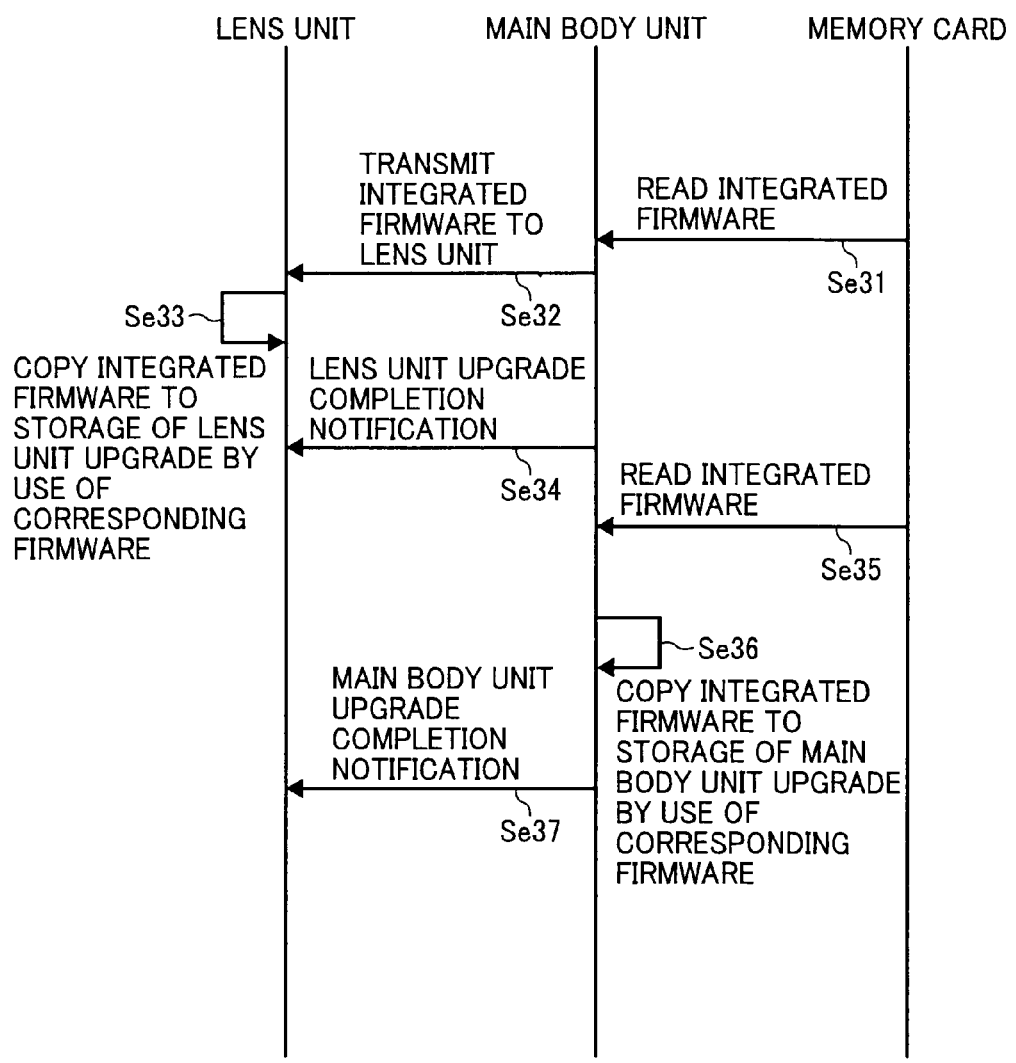
FIG. 14 is a diagram showing a processing sequence of firmware upgrading in the imaging system of Example 1.

FIG. 14 is a diagram showing a processing sequence of firmware upgrading in the imaging system. The integrated firmware formed of multiple firmwares of the lens unit 1 and the main body unit 2 is stored in the memory card 27 such as an SD card memory of the main body unit 2 in FIG. 3. Here, after the firmware versions are confirmed by exchanging unit information, firstly, the integrated firmware is read (Se31) to perform processing for the lens unit 1, and transmitted to the lens unit 1 via the communication I/F 21 (Se32). Upon receipt of the integrated firmware, the lens unit 1 copies the integrated firmware to the storage 12 for storing the integrated firmware and performs upgrade processing by use of the corresponding firmware (Se33). Upon completion of the processing, the lens unit 1 transmits a completion notification of upgrading the lens unit 1, to the main body unit 2 via the communication I/F 11 (Se34).

Further, after confirming completion of the upgrading of the lens unit 1, the main body unit 2 reads the integrated firmware (Se35). At this time, if the upgrading of the lens unit 1 has failed, forcible shut down processing is performed at this point. The integrated firmware similarly read by the main body unit 2 is copied to the storage 22 and upgrading processing is performed by use of the corresponding firmware (Se36). After completion of the upgrading, a completion notification of upgrading the main body unit 2 is transmitted to the lens unit 1 (Se37).

Note that although the integrated firmware may be stored either in the storage 12 of the lens unit 1 or in the storage 22 of the main body unit 2, it is more preferably stored in both of the lens unit 1 and the main body unit 2.

In addition, when the integrated firmware is read from the memory card 27, the read integrated firmware may be transmitted to the lens unit 1 and copied to the storage 12, and also copied to the storage 22 of the main body unit 2. These copying operations to the two units may be performed simultaneously or be performed in the reverse order. The upgrade processing may also be performed simultaneously in the respective controllers 10 and 20.

After the normal-upgrade completion notification is exchanged between the lens unit 1 and the main body unit 2, the information is used to update and register information on the corresponding firmware in the unit information. Thus, if the upgrading is completed normally, the units can refer to the updated version information, whereas if the upgrading is completed abnormally, the units can refer to the previous version information. Furthermore, version information on the integrated firmware is registered in the header part of the integrated firmware, so that even if there are multiple integrated firmwares, it can be determined whether they are the same or one is of a newer version.

When upgrading firmware, the firmware is upgraded to the latest one among the corresponding firmwares. Additionally, when upgrading firmware, the integrated firmware stored in the storage is also upgraded to the latest one. With this chained logic, a firmware of a new version in one of the multiple units can cause firmwares of the rest of the units to be overwritten to the new version. Specifically, if a lens unit having an integrated firmware of a new version stored in the storage thereof is added to multiple combinations of the lens unit and the main body unit, according to the aforementioned logic, the version of the firmware of the main body unit is firstly updated, and thereafter each of the remaining lens units having the firmwares of the old versions can be updated every time a different lens unit having the firmware of the old version is attached to the main body unit.

Thus, in a case where the latest integrated firmware is stored in the storage on the lens unit side and the integrated firmware is stored in the storage on the connectable main body unit side, the combination of the lens unit and the main body unit of the imaging system can be optimized.

In addition, as shown in FIG. 8, a version number of the integrated firmware itself is included in the header part of the integrated firmware. With this, it is possible to refer to and compare the version numbers of the integrated firmware stored in the storage of the main body unit and the integrated firmware in the memory card, and if one is of a new version, the other firmware itself can be upgraded to the latest version. Moreover, by providing the main body unit with a communication device capable of exchanging information with an external device, it is also possible to acquire the latest integrated firmware from an external device connected by wired or wireless communication.

Moreover, as shown in FIG. 8, firmwares of the respective versions in each of the models "models A to C" included in the header part are stored in the firmware part so that the multiple firmwares included in the integrated firmware can be checked individually. Hence, the respective firmwares can be checked by analyzing the header part. As can be seen in the header part, firmware names Alunch1 to Alunch5 and version numbers thereof are shown as the firmware of model A. Since the firmware (for each model) included in the integrated firmware can thus be recognized, the version number of each of the firmwares in the integrated firmware can be compared with that of the firmware of each unit by referring to the unit information of the unit, and the respective firmwares of the units can be upgraded according to the comparison.

Otherwise, combinations of compatible firmware versions may be stored as firmware for each model in the integrated firmware, so that upgrading can be performed unconditionally only by checking the version of the integrated firmware. This method can simplify the processing and can handle a case where specific firmware needs to be downgraded for a certain reason.

Figure 15:
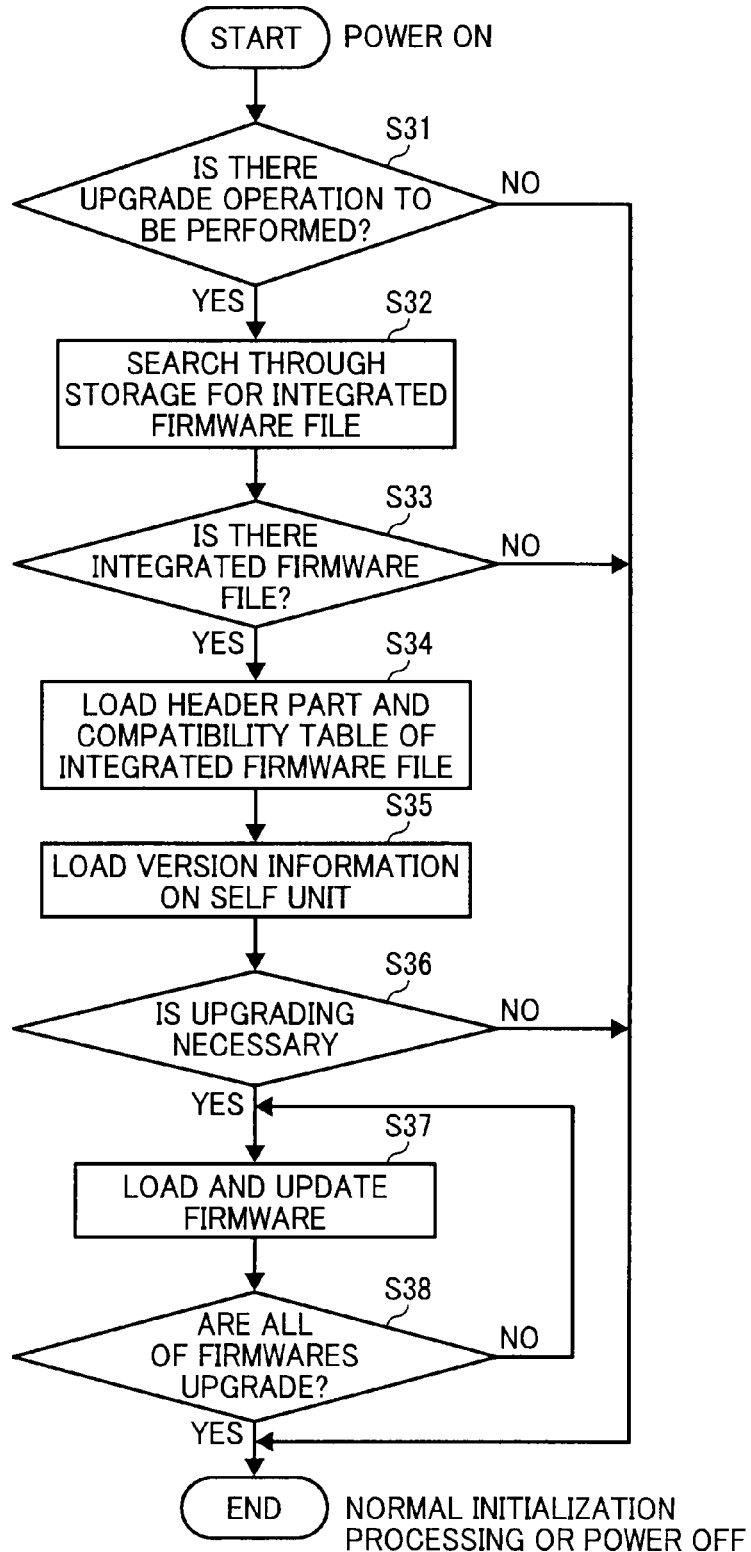
FIG. 15 is a flowchart showing upgrade processing performed between two units of Example 2 of the embodiment.

FIG. 15 is a flowchart showing upgrade processing performed between a lens unit and a main body unit of Example 2 of the embodiment. When the camera system is turned on, it is checked whether or not an upgrade instruction is issued (S31). As an example of this operation, the firmware-update operation example shown in FIG. 6 is performed as in Example 1. When the system is turned on while pressing down a certain button, the button is checked at the time of start up to select between two cases of initializing an upgrade operation if the button is turned on; and performing normal startup if the button is turned off. Hence, a processing sequence to be operated after turning on the system can be defined.

In Example 2, this selection is made at the portion described in the processing S31. If the upgrade is not instructed (No in S31), normal initialization processing is performed and then the camera system startup processing is performed. In a case where the upgrade operation is not performed and the upgrade check is automatically performed when the camera system is turned on, the processing S31 may be omitted.

If the upgrade is instructed (Yes in S31), a file search is performed to check whether or not the integrated-firmware file exists in a storage (memory card) of the self (main body) unit (S32). It is checked (S33) whether or not the integrated-firmware file exists by searching for the integrated firmware file stored in advance in the storage 22 or in the memory card 27 via the media controller 26 in FIG. 3. If the integrated-firmware file does not exist (No in S33), normal initialization processing is performed and then the camera system startup processing is performed. When moving on to the normal initialization processing, a message such as "there is no file for upgrading" may be displayed.

If the integrated-firmware file exists (Yes in S33), the processing proceeds to the next processing S34. FIG. 16 shows a configuration example of the integrated firmware of Example 2. The integrated firmware is a file in which firmwares of all units are integrated, and is formed of three parts: a header part including model information, version information on the registered firmware, and the number of registered firmwares; a later-described compatibility table part; and a firmware part including the actual firmware.

The header part and the compatibility table part necessary to check whether the upgrade should be performed are read from the integrated firmware and loaded onto the RAM of the controller 20 (S34). FIG. 17 shows an example of unit information of Example 2. The unit information stores therein a model number and file names of used firmwares of the self unit, as well as a version number of the firmware in use. These pieces of information are stored in the storage 22 of FIG. 3 so as not to be deleted even when the system is turned off. The unit information is read from the storage 22 and loaded onto the RAM of the controller 20 (S35).

The version number of firmware of the unit information shown in FIG. 17 is compared with the version number of firmware which corresponds to the self unit and registered in the header part of the integrated firmware shown in FIG. 16 to check whether or not the upgrade needs to be performed (S36). It is determined that the upgrade is necessary when "version number of unit information<version number of integrated firmware (header part)."

Otherwise, the version number of firmware of the unit information is compared with the compatible version number registered in the compatibility table part of the integrated firmware. It is determined that the upgrade is necessary when "version number of unit information<version number of integrated firmware (compatibility table part)" (Yes in S36). In this case, the version number in the compatibility table part indicates a lower limit of the compatibility condition, and thus it is determined that all of the version numbers lower than the compatible version number need to be upgraded.

As another method, it is determined that the upgrade is necessary when "version number of unit information ≠ (not equal to) version number of integrated firmware (compatibility table part)." In this case, it is determined that the version numbers larger than the version number in the compatibility table part also need to be upgraded, and thus downgrading may be required in some cases.

Next, there is also a method of preparing two types of version numbers in the compatibility table part to specify the upper and lower limits. It is determined that the upgrade is necessary when one of the two conditions "version number of unit information<lower limit version number of integrated firmware (compatibility table)," and "version number of unit information>upper limit version number of integrated firmware (compatibility table part)" is satisfied.

An example of an extended compatibility table part of the aforementioned comparative determination method is shown in FIG. 18. Whether to use "<," ">," "=," or "≠" to use the upper/lower limit; to use only the upper limit or only the lower limit; to refer to the version number in the header part; and the like may be identified by numerical values or bit assignment.

If it is determined in the processing S36 that the upgrade is unnecessary (No in S36), normal initialization processing is performed and then the camera system startup processing is performed. If the upgrade is determined as necessary, firmware corresponding to the model of the self unit, which is registered in the integrated firmware in FIG. 16, is loaded from the firmware part and upgrading is performed (S37). Then, it is determined whether upgrade of all firmwares included in the integrated firmware is completed (S38), and if so (Yes in S38), the processing proceeds to the camera system startup processing or processing for turning off the system.

Figure 19:
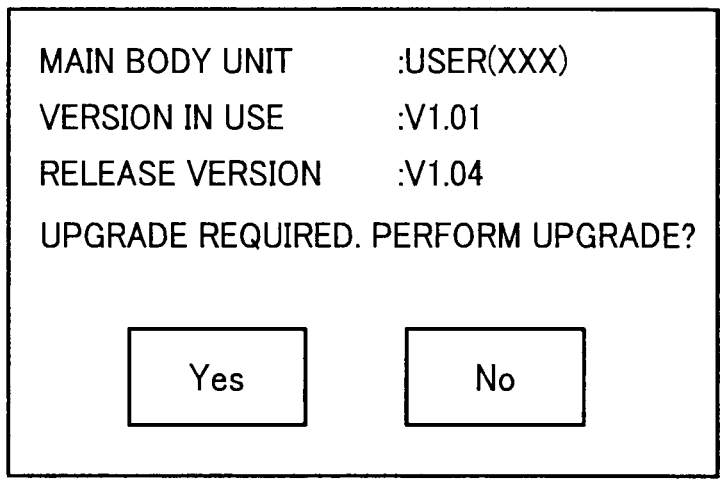
FIG. 19 is a diagram showing an upgrade screen displayed on a display in Example 2.

Further, if it is determined in the processing S36 of FIG. 15 that the upgrade is necessary (Yes in S36), an upgrade screen of FIG. 19 is shown on the display 24. This display is essential and necessary when the upgrade check is automatically performed with the processing S31 being skipped. This reconfirmation can further prevent erroneous operation. Moreover, since downgrading may be performed in some cases, it is meaningful to display the alert at this timing to confirm with the user.

Figure 20:
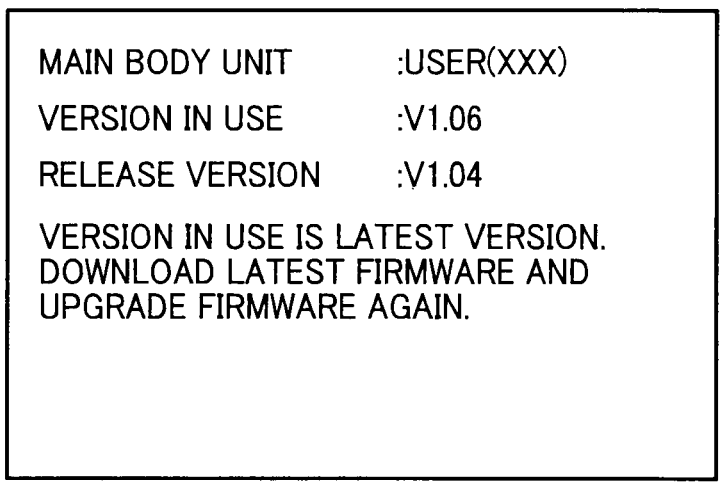
FIG. 20 is a diagram showing an upgrade alert screen displayed on the display in Example 2.

If it is determined in the processing S36 that the upgrade is unnecessary (No in S36), an upgrade alert screen of FIG. 20 may be displayed. Although in the example in FIG. 20 a guidance message "download (acquire) latest firmware and upgrade firmware again" requiring an upgrade is displayed, a message such as "latest version number is already installed. No processing is required" may be displayed to reassure the user.

In addition, a user name or the like, for example, may be registered in the unit information of Example 2 shown in FIG. 17, as information for specifying a unit. The user name may be registered in advance from a set-up screen of the camera system. Alternatively, a text file such as Alunch9.frm in which a user name is described may be registered as firmware in the integrated firmware shown in FIG. 16. This file may be read and be registered in the unit information. In this case, if a user name is not registered in a corresponding unit, the file is unconditionally registered, whereas if a user name is already registered, a screen for confirming the change or the like is displayed. The user name registered in the unit information may be displayed as in the display examples on a display device in FIGS. 19 and 20.

With this configuration, the user name can be displayed and confirmed for each device, so that erroneous upgrading of firmware of an unintended device can be prevented.

Figure 21:
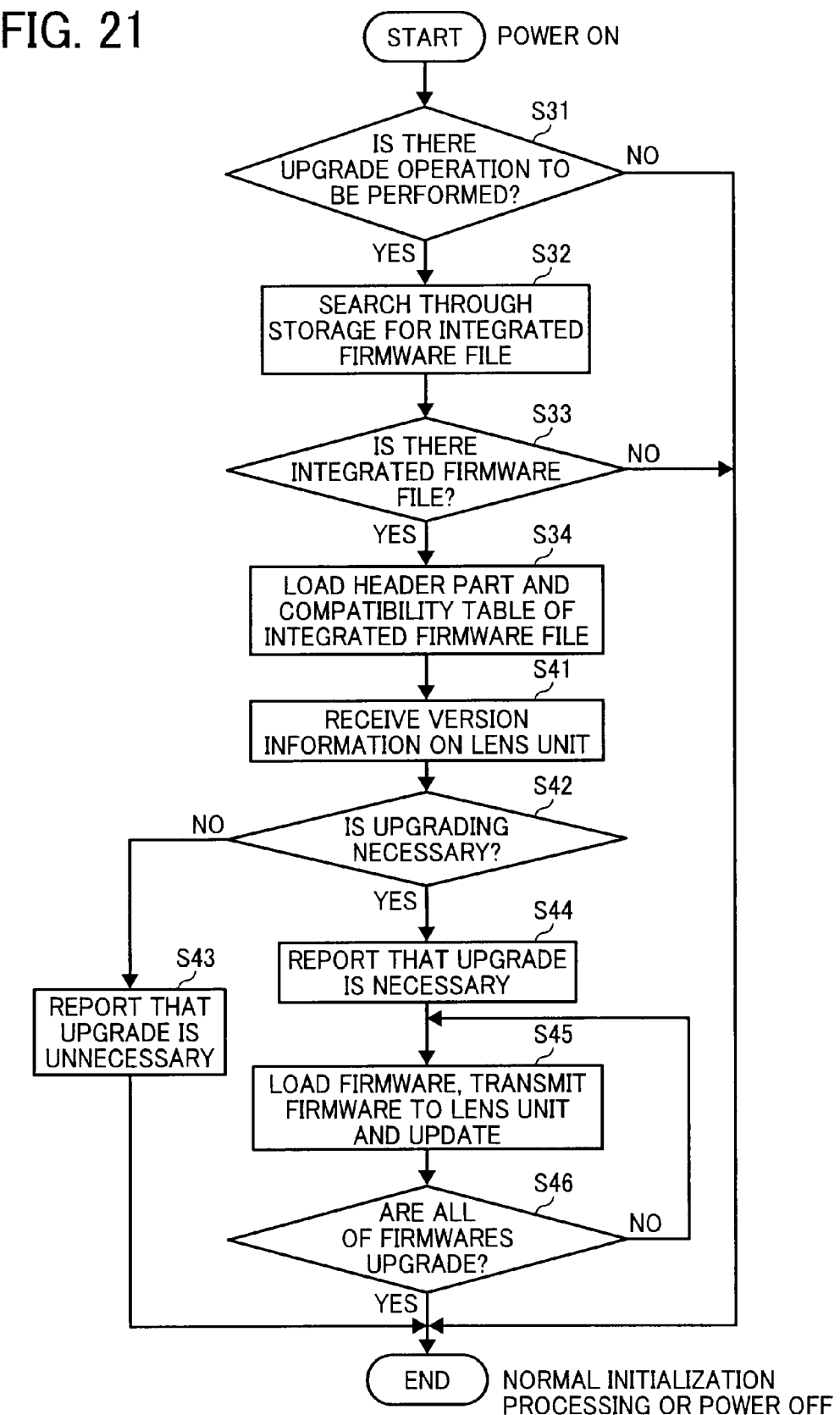
FIG. 21 is a flowchart showing upgrade processing of the lens unit performed on the main body unit side of Example 2.

FIG. 21 is a flowchart showing upgrade processing of the lens unit performed on the main body unit side of Example 2. When the camera system is turned on, it is checked whether or not an upgrade instruction is issued (S31). As an example of this operation, the firmware-update operation example shown in FIG. 6 is performed. When the system is turned on while pressing down a certain button, the button is checked to select between two cases of initializing an upgrade operation if the button is turned on; and performing normal startup if the button is turned off. Hence, a processing sequence to be operated after turning on the system can be defined. This selection is made in the processing S31 in FIG. 21, and if the upgrade is not instructed (No in S31), normal initialization processing and the camera startup processing are performed.

If the upgrade is instructed (Yes in S31), a file search is performed to check whether or not the integrated-firmware file exists in a storage (memory card) of the self (main body) unit (S32). It is checked (S33) whether or not the integrated-firmware file exists by searching for the integrated firmware file stored in advance in the storage 22 or in the memory card 27 via the media controller 26 in FIG. 3. If the integrated-firmware file does not exist (No in S33), normal initialization processing is performed and then the camera system startup processing is performed. When moving on to the normal initialization processing, a message such as "there is no file for upgrading" may be displayed.

If the integrated-firmware file exists (Yes in S33), the processing proceeds to the next processing S34. In the processing S34, from the integrated firmware configured of the header part, the compatibility table part and the firmware part as has been shown in the configuration example of FIG. 16, the header part and the compatibility table required for the upgrade are read and loaded onto the RAM of the controller 20 (S34). Additionally, as in the unit information shown in FIG. 17, in the lens unit 1 of FIG. 3, for example, a model number of the unit, file names of the used firmwares and a version number of the firmware in use are stored in the storage 12. This information is loaded onto the RAM of the controller 20 via the communication I/F 11 and 21 (S41).

The processing S42 of checking whether or not the upgrade is necessary is the same as the processing S36 of FIG. 15. If the upgrade is unnecessary (No in S42), the lens unit 1 is notified to that effect via the communication I/F 11 and 21 (S43). If the upgrade is necessary (Yes in S42), the lens unit 1 is notified that the upgrade is necessary (S44).

Next, the firmware in the firmware part corresponding to the model of the counterpart unit (lens unit 1), which is registered in the integrated firmware of FIG. 16, is loaded and transmitted to the lens unit 1 (S45). It is determined whether upgrading of all of the firmwares has been completed (S46), and if so, (Yes in S46), the processing proceeds to the startup processing of the camera system or processing for turning off the system.

Figure 22:
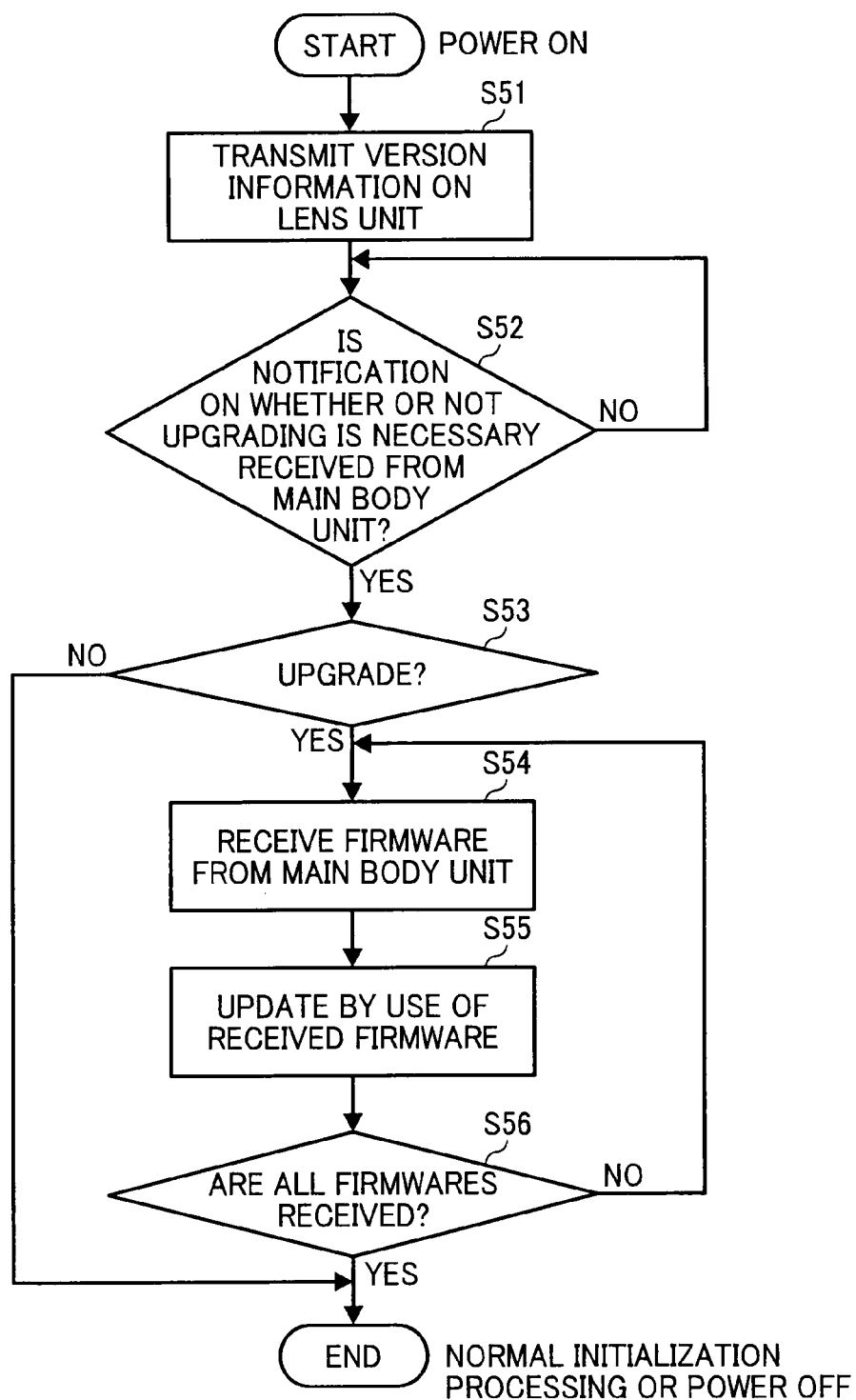
FIG. 22 shows a flowchart of upgrade processing performed on the lens unit side of Example 2.

FIG. 22 shows a flowchart of upgrade processing performed on the lens unit side. In the lens unit 1, version information is stored in the storage 12 of FIG. 3 after being powered on so that the information is not erased after the unit is powered off. The version information is read from the storage 12 and loaded onto the RAM of the controller 10, to be transmitted to the main body unit 2 via the communication I/F 11 and 21 of FIG. 3 (S51).

Wait for notification from the main body unit on whether or not the upgrade is necessary (S52). Notification on whether or not the upgrade is necessary is received (S53), and if the upgrade is not to be performed (No in S53), normal initialization processing is performed and then camera startup processing is performed. If the upgrade is to be performed (Yes in S53), the firmware transmitted from the main body unit 2 is received (S54). The self (lens unit 1) firmware is updated with the received firmware (S55). It is checked whether all of the firmwares are received and upgrading of the firmwares is completed (S56). If so, (Yes in S56) the processing is terminated.

Figure 23:
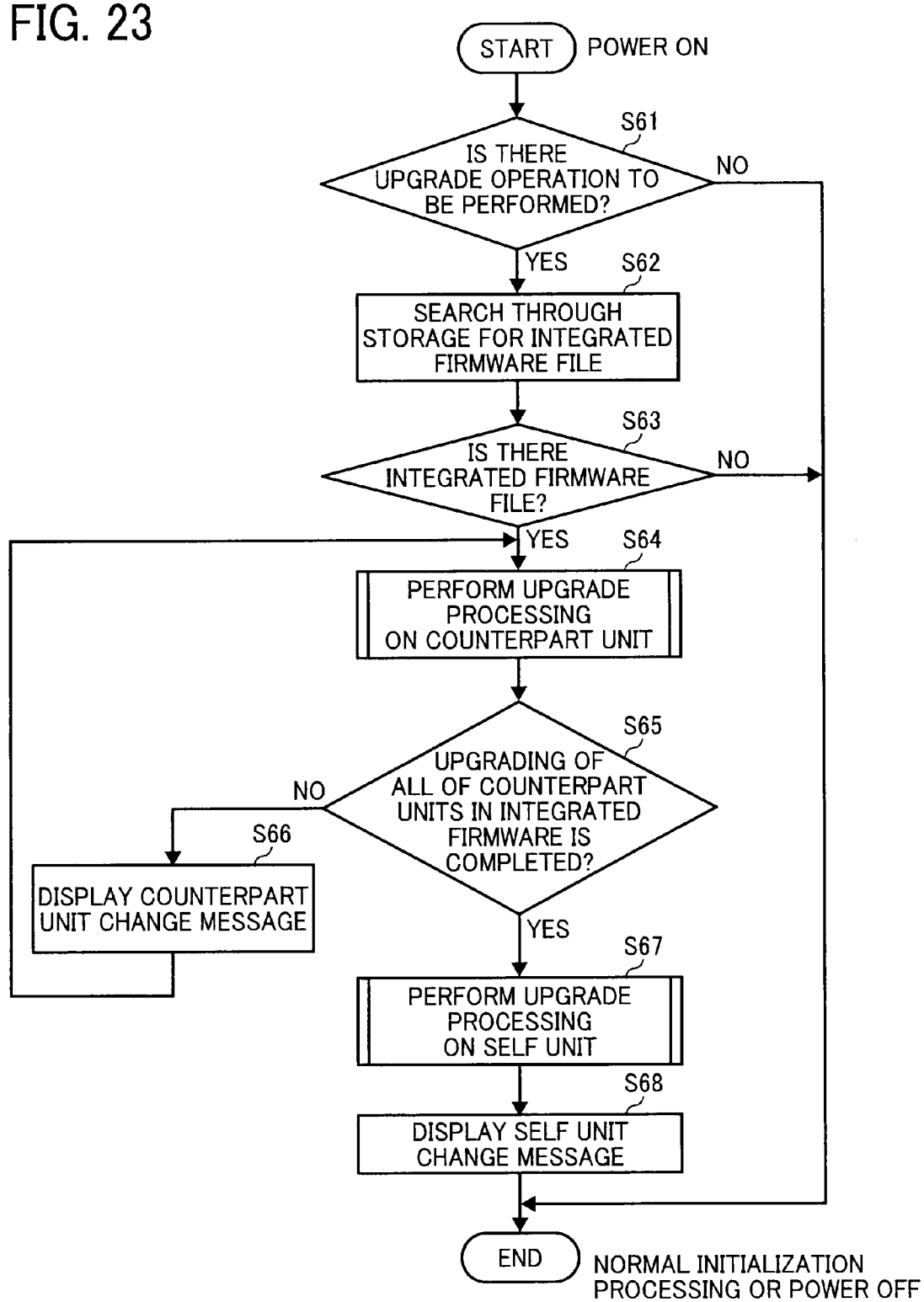
FIG. 23 is a flowchart of upgrade processing performed between units in Example 3 of the embodiment.

FIG. 23 is a flowchart showing upgrade processing performed between a lens unit and a main body unit in Example 3 of the embodiment. When the camera system is turned on, it is checked whether or not an upgrade instruction is issued (S61). As an example of this operation, the firmware-update operation example shown in FIG. 6 is performed. When the system is turned on while pressing down a certain button, the button is checked to select between two cases of: initializing an upgrade operation if the button is turned on; and performing normal startup if the button is turned off. Hence, a processing sequence to be operated after turning on the system can be defined. This selection is made in the processing S61 in FIG. 23, and if the upgrade is not instructed (No in S61), normal initialization processing and the camera startup processing are performed.

If the upgrade is instructed (Yes in S61), a file search is performed to check whether or not the integrated-firmware file exists in a storage (memory card) of the self (main body) unit (S62). It is checked (S63) whether or not the integrated-firmware file exists by searching for the integrated firmware file stored in advance in the storage 22 or in the memory card 27 via the media controller 26 in FIG. 3. If the integrated-firmware file does not exist (No in S63), normal initialization processing is performed and then the camera system startup processing is performed. When moving on to the normal initialization processing, a message such as "there is no file for upgrading" may be displayed.

If the integrated-firmware file exists (Yes in S63), the processing proceeds to the next processing S64. The processing S64 is configured to call the flowchart of the upgrading of the counterpart unit shown in FIG. 21 as a subroutine. While there are cases where the upgrade is performed and where the upgrade is not performed, after completion of the processing S64, the processing S65 is performed.

If multiple counterpart (lens) units are registered in the integrated firmware, it is checked whether or not upgrade of all the counterpart (lens) units is completed (S65). The number of multiple counterpart (lens) units registered in the integrated firmware can be determined by referring to the header part of the integrated firmware of FIG. 16.

Figure 24:
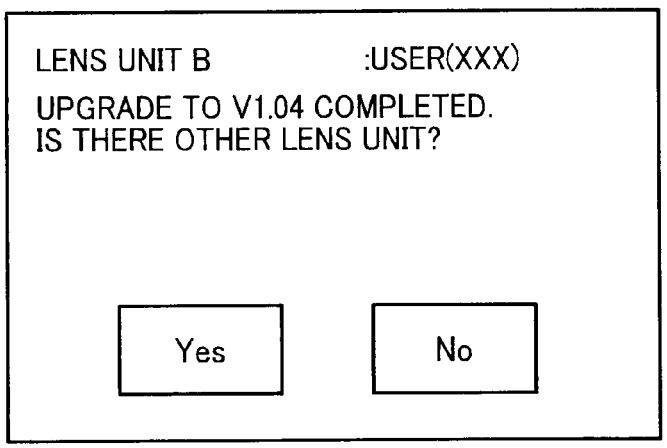
FIG. 24 is a diagram showing a lens unit change screen displayed on a display in Example 3.
Figure 25:
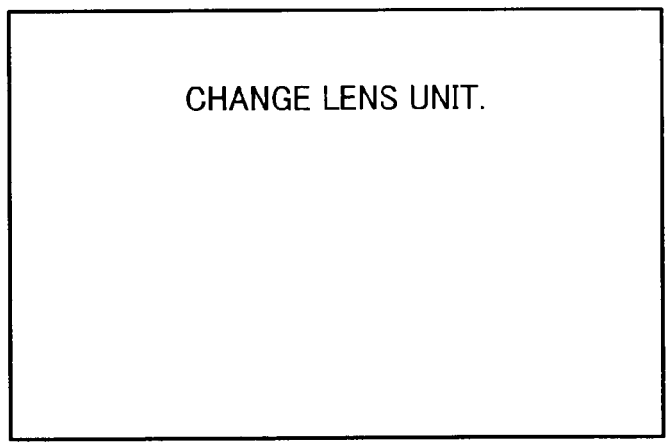
FIG. 25 is a diagram showing a lens unit change prompt screen displayed on the display in Example 3.

If not all of the counterpart (lens) units are upgraded (No in S65), a "lens unit change screen" as shown in FIG. 24 is displayed to prompt changing of the lens unit and after instruction is inputted after the changing, the processing S64 is performed. Otherwise, a "lens unit change prompt screen" as shown in FIG. 25 is displayed to prompt the user to change the counterpart (lens) unit (S66).

When upgrading of all the counterpart (lens) units is completed or "No" is selected on the display screen of FIG. 24, the next processing S67 is performed. The processing S67 is configured to call the flowchart of upgrading the self (main body) unit shown in FIG. 15 as a subroutine. While there are cases where the upgrade is performed and where the upgrade is not performed, after completion of the processing S67, the processing S68 is performed.

Figure 26:
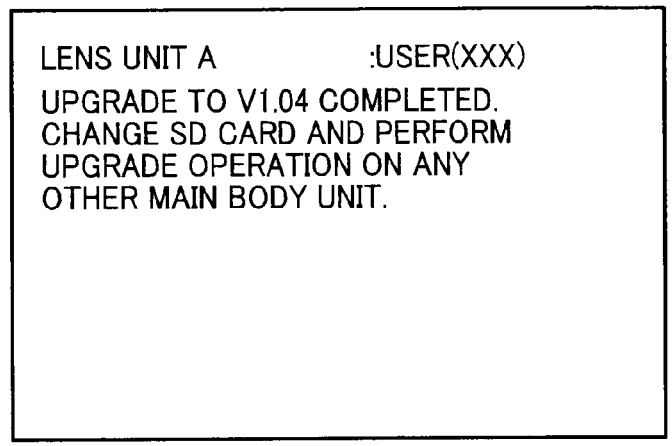
FIG. 26 is a diagram showing a main body unit change prompt screen displayed on the display in Example 3.

After completion of upgrading firmware of all the self (main body) units, a "main body unit change prompt screen" as shown in FIG. 26 is displayed to prompt the upgrade of the next main body unit. After displaying the display screen for several seconds, the processing is terminated (S68).

The processing S68 is performed since in some cases multiple self (main body) units are registered in the integrated firmware or the user owns multiple main body units.

The number of the multiple self (main body) units registered in the integrated firmware can be determined by referring to the header part of the integrated firmware shown in FIG. 16, and the type of the main body unit can be determined by comparison with the unit information.

In the imaging system according to the invention, multiple firmwares of each unit can be used in every lens unit or main body unit as a single integrated firmware, so that firmware version management is made easy. Thus, upgrade processing is made more efficient and the invention is useful for a digital camera with interchangeable lenses.

With the above-described configuration, multiple firmwares of the lens unit and the main body unit can be handled as a single integrated firmware, and thus erroneous operation by the user can be reduced. Additionally, since all of the lens units and main body units can commonly use the firmware, it is easy to manage the versions and upgrade processing can be made more efficient.

With the above-described configuration, performing or not performing upgrade processing can be controlled by use of unit information including external factors such as a voltage of a power source, free space in the storage and the like. Hence, upgrading can be performed more precisely.

With the above-described configuration, the user can be notified of an upgrading result.

With the above-described configuration, both units can be upgraded simultaneously, which makes it easier to perform the upgrading.

With the above-described configuration, the integrated firmware can be upgraded to the latest version.

With the above-described configuration, it can be determined whether or not upgrade of firmware is necessary, which facilitates processing and improves efficiency.

With the above-described configuration, it is possible to check the result of upgrade processing, so that erroneous operation can be prevented.

With the above-described configuration, upgrade processing can be checked and may be terminated, which can prevent erroneous operation.

With the above-described configuration, the unit for which upgrade processing is performed can be checked easily, so that erroneous operation can be prevented.

With the above-described configuration, messages are displayed so that all of the lens units to be subjected to upgrading can be prompted to be changed in turn, which enables processing on all of the units and prevents erroneous operation.

With the above-described configuration, messages are displayed so that all of the main body units to be subjected to upgrading can be prompted to be changed in turn, which enables processing on all of the units and prevents erroneous operation.

According to the embodiment of the present invention, multiple firmwares of the respective units can be handled as a single integrated firmware, and thus erroneous operation by the user can be reduced. Additionally, since all of the lens units and main body units can commonly use the firmware, it is easy to manage the versions and upgrade processing can be made more efficient.

Although the embodiment of the present invention has been described above, the present invention is not limited thereto. It should be appreciated that variations may be made in the embodiment described by persons skilled in the art without departing from the scope of the present invention.

What is claimed is:
1. An imaging system, comprising:
 a lens unit including an imaging device which converts an optical image representing an object into image data by an imaging unit;
 a main body unit which holds the lens unit in such a manner that the lens unit is attachable to and detachable from the main body unit; and
 a controller configured
 to exchange an integrated firmware between the lens unit and the main body unit via a communication device, the integrated firmware integrating at least one firmware of the lens unit and at least one firmware of the main body unit,
 compare, via a compatibility table included in the integrated firmware, a version number held in unit information exchanged between the lens unit and the main body unit to an upper and lower limit of a version number of a unit corresponding to the unit information, and
 to upgrade, in response to at least one of the version number being lower than the lower limit and the version number being higher than the upper limit, at least one of the firmwares of the lens unit or main body unit with a corresponding firmware in the integrated firmware to obtain a compatible combination of firmware of the main body unit and lens unit.

2. The imaging system according to claim 1, wherein the controller is configured to upgrade the firmware according to firmware-upgrade possibility information added to unit information exchanged between the lens unit and the main body unit.

3. The imaging system according to claim 1, wherein, the controller is configured to display an execution result on a display device according to information on a result of execution in which the firmware is upgraded, the information being exchanged between the lens unit and the main body unit.

4. The imaging system according to claim 1, wherein the controller is configured to upgrade the firmware of both of the lens unit and the main body unit, and to upgrade simultaneously respectively a corresponding firmware in the integrated firmware.

5. The imaging system according to claim 1, wherein the controller is configured to compare version information of an integrated firmware stored in a storage of the lens unit with version information on an integrated firmware stored in a storage of the main body unit, and to upgrade the integrated firmware according to the result of comparing the version information.

6. The imaging system according to claim 5, wherein the controller is configured to compare the version information on the integrated firmware stored in the storage of the main body unit with version information on an integrated firmware stored in an external storage instead of the lens unit.

7. The imaging system according to claim 1, wherein the controller is configured to display a determined result on whether or not to perform the upgrade on a display device.

8. The imaging system according to claim 1, wherein the controller is configured to display, according to the determined result, a screen on a display device so that a user is able to select whether or not to perform the upgrade.

9. The imaging system according to claim 1, further comprising:
 a device configured to register information which enables specification of each unit in the unit information exchanged between the lens unit and the main body unit, wherein
 the registered information is displayed on a display device at the time of upgrading a firmware.

10. The imaging system according to claim 1, wherein, in a case where the integrated firmware includes firmwares corresponding to a plurality of lens units, a message to prompt changing of the lens unit is displayed on a display device after the upgrade so that the firmwares of the plurality of lens units are upgraded in turn.

11. The imaging system according to claim 1, wherein, in a case where the integrated firmware includes firmwares corresponding to a plurality of main body units, a message to prompt changing of the main body unit is displayed on a display device after the upgrade so that the firmwares of the plurality of main body units are upgraded in turn.

12. An imaging method for an imaging system having a lens unit and main body unit, the method comprising:

converting via the lens unit an optical image representing an object into image data;

holding, at the main body unit, the lens unit in such a manner that the lens unit is attachable to and detachable from the main body unit;

exchanging an integrated firmware between the lens unit and the main body unit via a communication device, the integrated firmware integrating at least one firmware of the lens unit and at least one firmware of the main body unit;

comparing, via a compatibility table included in the integrated firmware, a version number held in unit information exchanged between the lens unit and the main body unit to an upper and lower limit of a version number of a unit corresponding to the unit information, and upgrading, in response to at least one of the version number being lower than the lower limit and the version number being higher than the upper limit, at least one of the firmwares of the lens unit or main body unit with a corresponding firmware in the integrated firmware to obtain a compatible combination of firmware of the main body unit and lens unit.

* * * * *